July 18, 1961 G. B. RICHARDS 2,992,757
LIQUID TRANSMISSION SYSTEMS
Original Filed Dec. 16, 1955 6 Sheets-Sheet 1
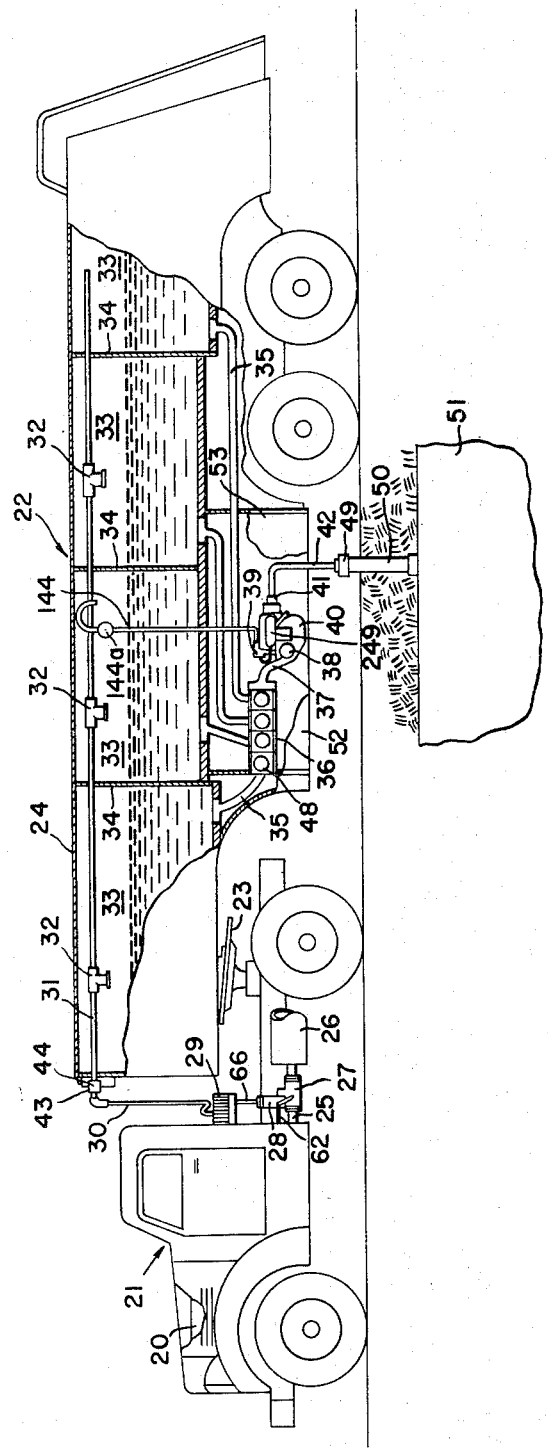
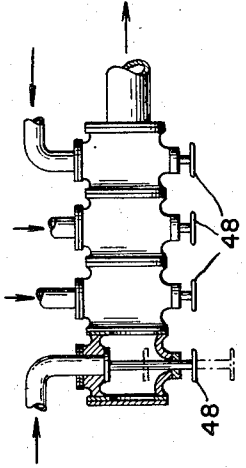
*INVENTOR*
GEORGE B. RICHARDS
BY
ATTORNEYS

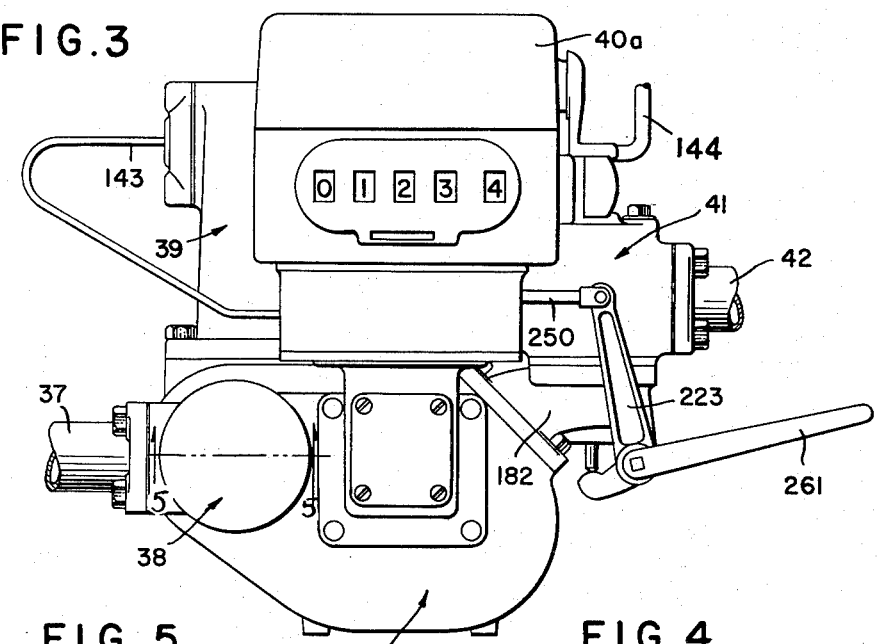
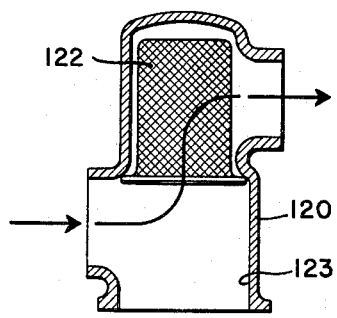
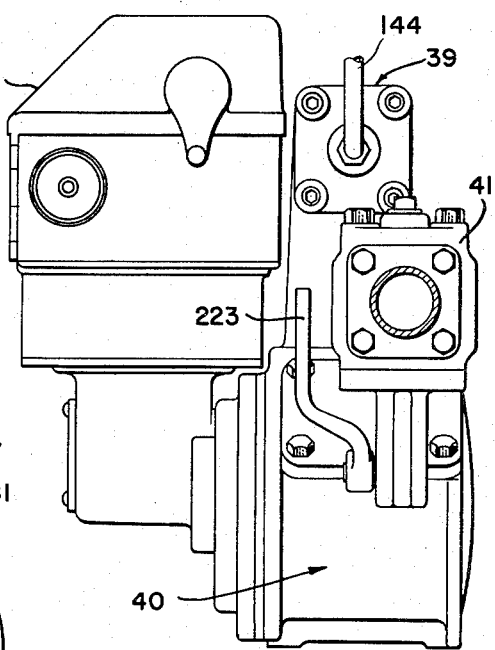
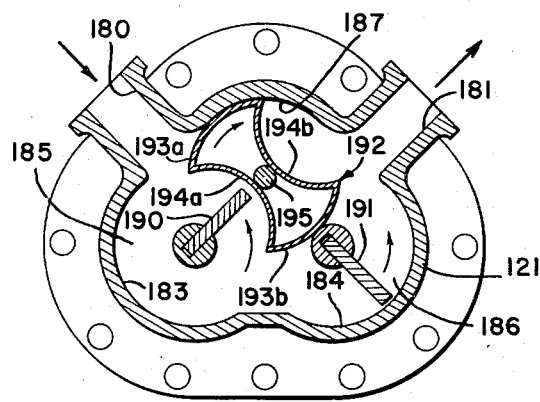

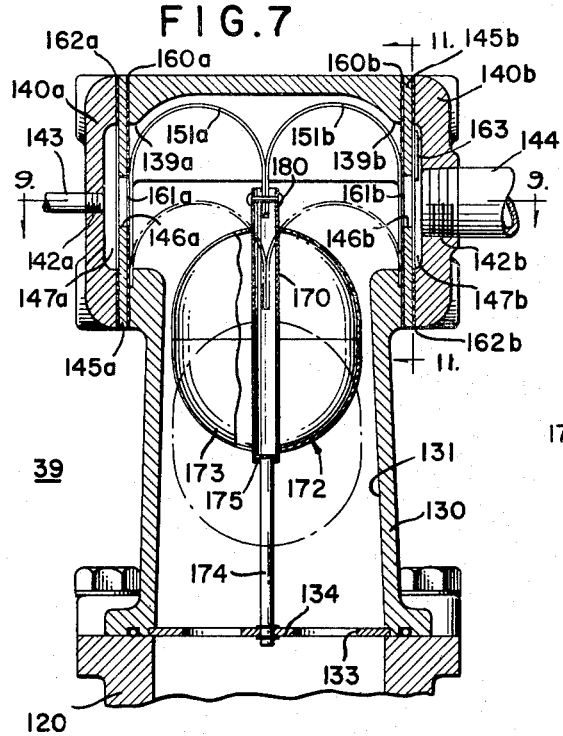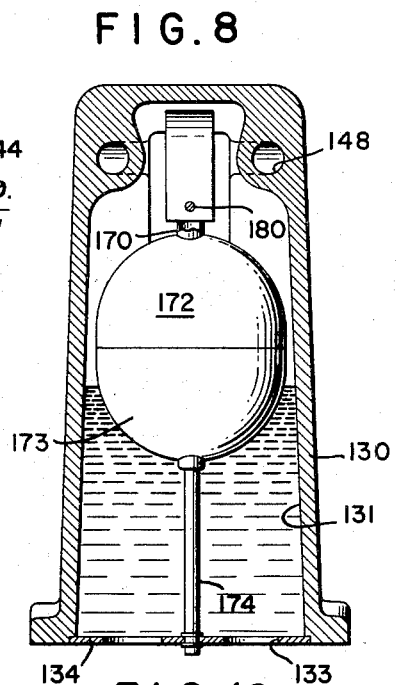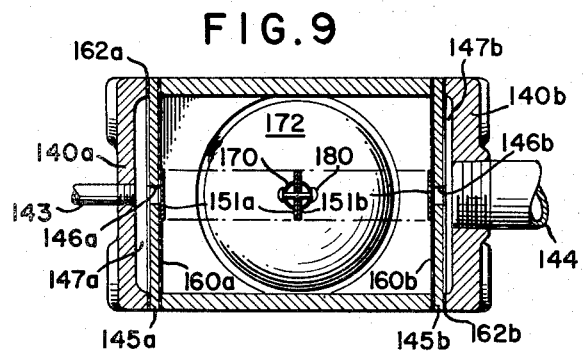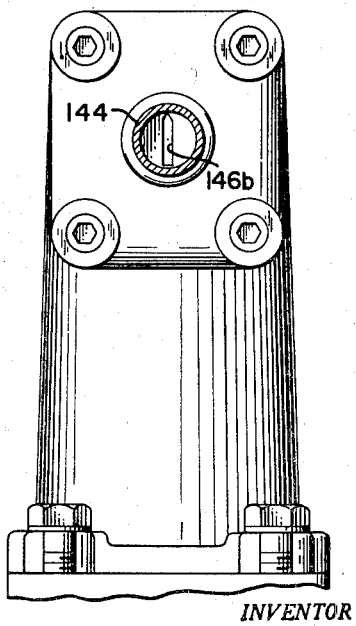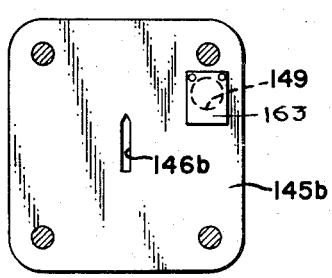
INVENTOR
GEORGE B. RICHARDS
ATTORNEYS

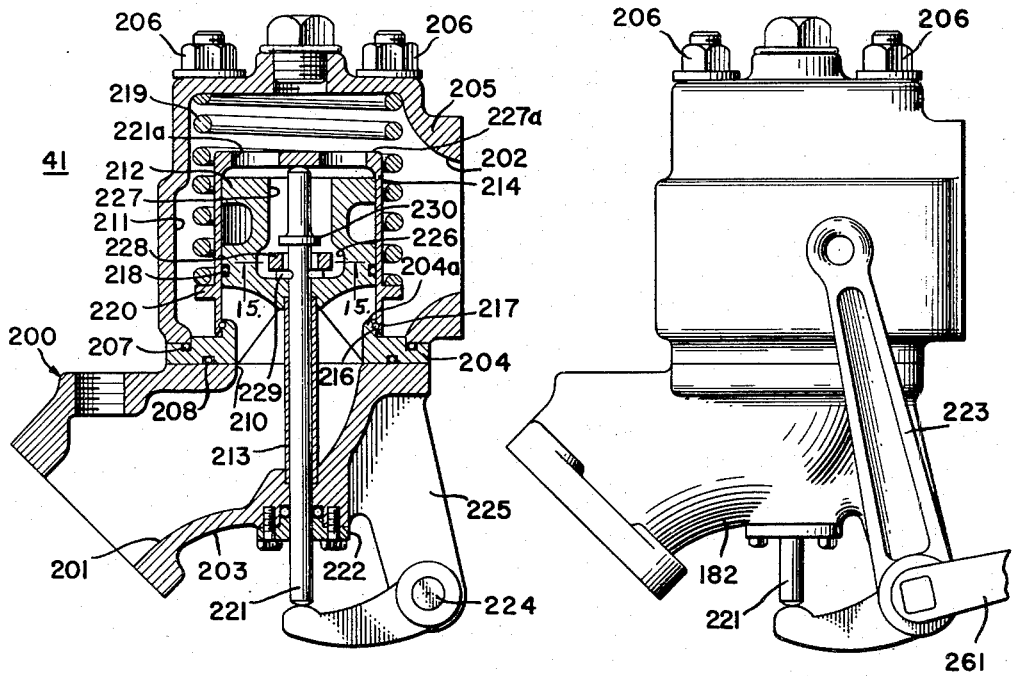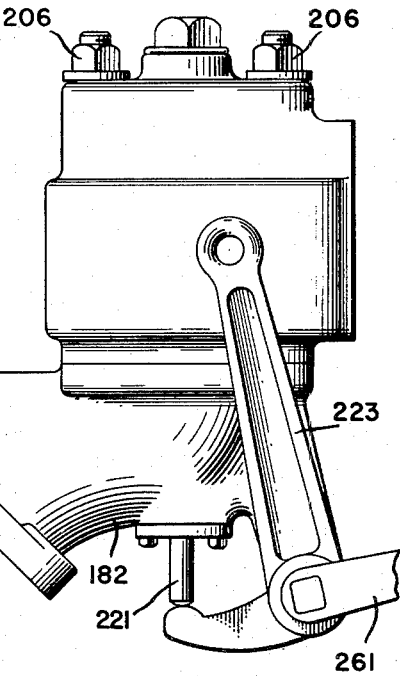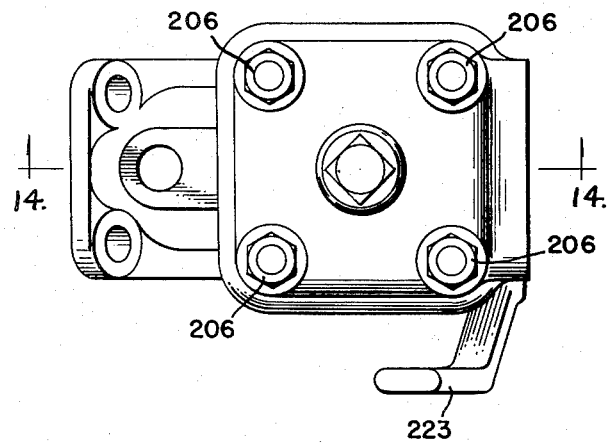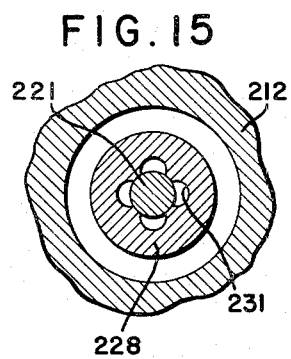

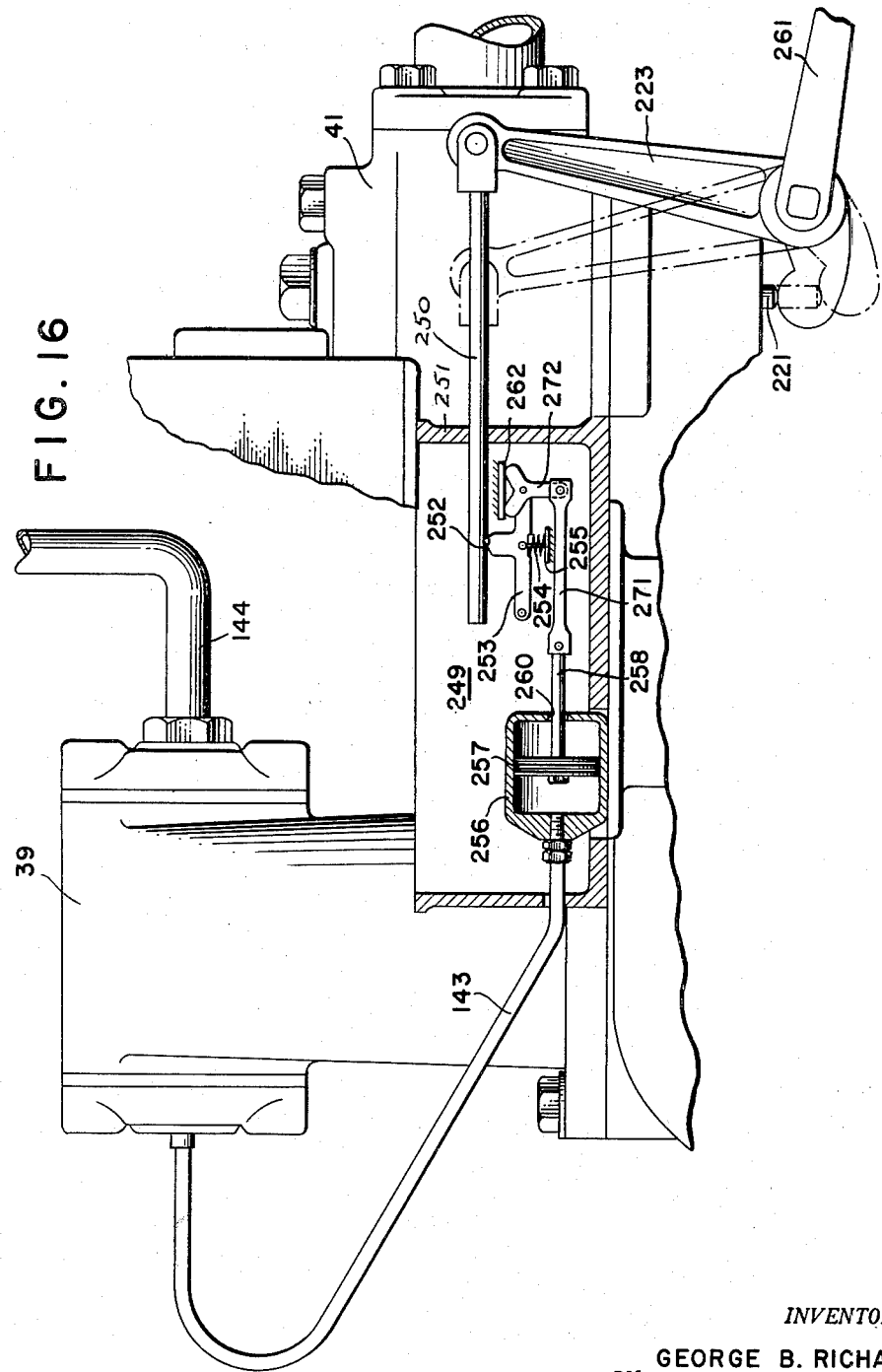

July 18, 1961   G. B. RICHARDS   2,992,757
LIQUID TRANSMISSION SYSTEMS
Original Filed Dec. 16, 1955   6 Sheets-Sheet 6

INVENTOR.
GEORGE B. RICHARDS
BY
ATTORNEYS

2,992,757
LIQUID TRANSMISSION SYSTEMS
George B. Richards, Deerfield, Ill., assignor to Liquid Controls Corporation, Chicago, Ill., a corporation of Illinois
Continuation of application Ser. No. 553,506, Dec. 16, 1955. This application Feb. 24, 1959, Ser. No. 795,153
14 Claims. (Cl. 222—61)

This invention relates to liquid transmission systems and has to do more particularly with means for stopping the flow of the principal fluid through the system whenever an undesired, second fluid, such as air or other gas, or another and immiscible liquid, enters the system along with the principal liquid.

Flow in a liquid transmission system is produced by establishing a differential pressure between the inlet and the outlet of the system. This may be accomplished by providing for a gravity head, including positive and negative head, or by raising the pressure on the surface of the liquid at the inlet, as by the use of a compressor, or by use of a pump to provide pressure or suction in the line.

In many liquid transmission systems it is desirable to prevent the passage through the system of another fluid such as air or other gases or a second liquid which is immiscible with the principal liquid. For example, in a line conducting a petroleum product such as gasoline, it is desirable to prevent the passage of air or other gases, or water.

In discharging liquids from storage tanks or the like it is customary to provide in the discharge line means, such as a meter, for measuring the amount of liquid discharge. In discharging a tank, air may enter the discharge connection, as for example when the tank is completely discharged and before the operator halts the further discharge, or where the discharge is transferred from one tank to another or one compartment of a tank to another compartment, with the result that the meter will continue to operate and to indicate the flow of fluid, even after the liquid has ceased to pass therethrough and air or other gases pass through the meter, thereby incorrectly indicating a flow of liquid.

Another instance where it is desirable to prevent the flow of air or other gas through a liquid system is where liquid tanks are discharged by gravity and to aid the action of gravity, gas under pressure is introduced into the tank. In such case, unless the operator constantly observes the discharging of the tank and stops the flow of fluids therefrom as soon as the liquid is fully discharged, air or other gas will flow from the tank and the pressure will be reduced or entirely lost. It is important to prevent such loss of pressure where several interconnected compartments of a single tank are being discharged successively by the application of gaseous pressure thereto.

The presence of air or other gas in a liquid system also is undesirable where a pump is connected in the system on the downstream side of a tank. It is important in such case to prevent air from entering the pump in order to prevent loss of priming of the pump. Other instances where the pressure of air or other gases is undesirable and should be prevented are where liquids are caused to flow through long lines, and where liquid pumps are operated unattended for long periods of time.

In addition to the foregoing, it is sometimes desired to prevent the passage through a liquid transmission line of a secondary undesired liquid. For example, in withdrawing the heavier of two immiscible liquids from a tank in which both liquids are present, it is desirable that only the heavier liquid pass through the discharge line.

Means, such as "air eliminators," have been provided heretofore for removing air or other gas from liquid systems. However, it has been found that such means are not effective in all cases for preventing the passage of air or other gas through the system.

Customarily, means are provided for creating artificially the necessary pressure differential over the air eliminator to insure that all air or other gas is discharged thereby. For this purpose a float-actuated check valve is employed in a gravity and/or pump operation and a spring-loaded check valve is used where a pump alone is employed. Float-actuated valves, which are usually of the butterfly type, are not satisfactory as they are not fluid tight, create turbulence, are unreliable in operation, require operating linkages which are space-consuming and become fouled by congealed oils and gums, frequently close even though no air or other gas is present, frequently lock closed and fail to open, cause substantial pressure loss even when open, and require a large container for the float with attendant disadvantages. Spring loaded check valves cause a high back pressure at all times, induce wire drawing and vaporization at low flows, cannot be used with gravity flow systems, cannot relieve heat expansion pressure in the fluid and present difficulty to the pump in picking up the prime where there is a high, fixed discharge head.

An object of the present invention is to provide new and improved apparatus for preventing the flow of a secondary and undesired fluid through a line adapted to transmit a primary liquid.

Another object is to provide new and improved apparatus for halting the flow through a liquid transmission line having means therein for discharging an undesired secondary fluid whenever the fluid discharging means is incapable of discharging all of the undesired fluid from the line.

Another object is the provision of new and improved apparatus for measuring liquid flow.

Another object is to provide new and improved apparatus for measuring liquid flow which is not subject to inaccuracies resulting from the passage of air or other secondary fluids into the apparatus.

Another object is to provide liquid flow measuring apparatus in which is embodied means for automatically stopping the flow of fluid through the apparatus whenever a secondary fluid passes into the apparatus and before it passes through the meter, whereby no inaccuracies in measuring can result from the passage of air through the meter.

Another object is to provide liquid flow measuring apparatus of great accuracy which is relatively simple and inexpensive to construct, is efficient in operation, and requires a minimum of attention and servicing.

Another object is to provide liquid flow measuring apparatus having means for halting the actuation of the apparatus to indicate fluid flow therethrough whenever air or another second fluid enters the apparatus, which apparatus is simple and compact and is well adapted for installation in a large variety of different types of liquid conduits.

Other objects are to provide apparatus for discharging air or other fluids from a liquid line and for halting the flow of fluid through a liquid line when the gas discharging means is incapable of discharging all of the air or other fluid from the line, which apparatus effectively closes the line when, and only when, air or another second fluid enters the line in excess of the capacity of the fluid discharging means; which is effective and reliable in lines of various diameters including large diameter lines; which is not subject to malfunctioning because of fouling or other causes; which is readily restored to its initial condition to allow liqiud to flow through the line; which is so constructed as not to cause excessive pressure loss in the line; which is small and compact; which does not induce wire drawing and vaporization; and which permits relief of heat expansion pressure.

Other objects and advantages of the invention will appear from the following description taken in connection with the appended drawings wherein:

FIGURE 1 is a side elevational view with parts broken away and in section showing a system embodying my invention, wherein gaseous pressure is employed to aid in causing the flow of liquid through the line;

FIG. 2 is an enlarged fragmentary view showing the discharge manifold forming a part of the system carried on a tank truck of FIG. 1;

FIG. 3 is a side elevational view of apparatus including a strainer-air eliminator-meter-valve assembly embodying the present invention;

FIG. 4 is an end elevational view of the assembly of FIG. 3;

FIG. 5 is a fragmentary horizontal sectional view taken along line 5—5 of FIG. 3;

FIG. 6 is a fragmentary, somewhat diagrammatic, vertical sectional view showing the interior of the meter forming a portion of the apparatus;

FIG. 7 is an enlarged vertical sectional view through the air eliminator head;

FIG. 8 is a view similar to FIG. 7, only taken along a vertical plane in right angles to the plane of FIG. 7;

FIG. 9 is a view of a section taken along line 9—9 of FIG. 7;

FIG. 10 is an end elevational view of the air eliminator of FIG. 7;

FIG. 11 is an enlarged fragmentary sectional view taken along line 11—11 of FIG. 7;

FIG. 12 is a side elevational view of the cut-off valve;

FIG. 13 is a top plan view of the cut-off valve;

FIG. 14 is a vertical section taken on line 14—14 of FIG. 13;

FIG. 15 is a fragmentary sectional view taken along line 15—15 of FIG. 14;

FIG. 16 is a fragmentary side elevational view, with certain of the parts broken away and in section, showing the automatic stop mechanism;

Figure 17:
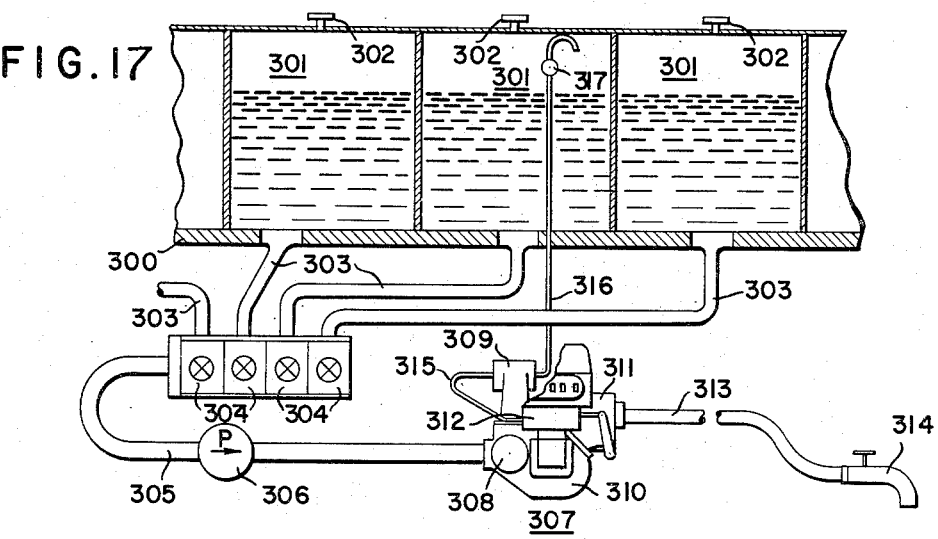
FIG. 17 is a diagrammatic view of a system wherein positive pump pressure is employed to force the liquid through the line.

In accordance with the present invention I provide a liquid flow system including a cut-off valve for stopping the flow of fluid through the system and control mechanism actuated by the presence of an undesired, secondary fluid therein for causing the cut-off valve to close. The undesired secondary fluid in many applications of my invention will consist of air, or a mixture of air and vapors of the liquid being transmitted as are present, for example, in a line employed in discharging a gasoline tank. However, the undesired fluid may instead consist of a liquid which is immiscible with the primary liquid, or both such a liquid and a gas. Therefore, while I have described the invention in connection with its use in discharging a gas, it will be understood that the invention is not thus limited. In the preferred embodiment of my invention the cut-off valve is normally urged toward closed position and is held open by the control mechanism which includes a latch and tripping means therefor. An "air eliminator" is connected in the line and serves both to discharge air or other fluid from the line and to actuate the tripping means.

For the purpose of illustrating my invention I have shown it in connection with application to a system wherein the flow is effected by pressurizing the tank to be discharged, such as disclosed and claimed in the copending application of Henry Robert Billeter and George B. Richards, Serial No. 553,592, filed December 16, 1955, now Patent No. 2,894,659. It will be understood however, that my invention is not limited to such application but is applicable also to a system wherein a pump is employed to force the liquid through the line, or wherein gravity is employed, or a pump suction is used to draw the liquid through the line.

Referring now particularly to FIG. 1, there is shown for purposes of illustration a tank truck including a tractor unit 21 and a semi-trailer 22 having a closed (unvented) tank 24. Carried by the tractor 21 and forming a portion thereof is the usual internal combustion engine 20 and a system for pressurizing the tank 24. Such system includes an exhaust line 25 leading from the internal combustion engine 20, a pressure regulator 27, a fire stop or flame arrester 28, an intercooler or heat exchanger 29 and a flexible pipe hose 30 connecting with a gas inlet manifold 31 which communicates to inlets 32 with each of the several compartments 33 of the tank 24. Such an arrangement for pressurizing a tank is disclosed more in detail in the aforementioned copending application of Henry Robert Billeter and George B. Richards.

Leading from the several compartments 33 are discharge pipes 35 all of which are conected with a discharge manifold 36 including valves 48 controlling flow through the several pipes 35 respectively. A single outlet pipe 37 connected to the discharge manifold leads to a strainer 38 with which is associated an air eliminator 39. The strainer casing is connected to a meter 40 which in turn is connected to a cut-off valve 41, actuated from the air eliminator by a valve control mechanism 249 (see FIG. 16).

The internal combustion engine 20, exhaust line 25, muffler 26, pressure regulator 27, fire stop 28, intercooler 29, pipe 30, and the connected portion of the coupling 43, are carried by the tractor unit. The remainder of the coupling 43, swing check valve 44, manifold 31, discharge pipes 35, manifold 36, outlet pipe 37, strainer 38, air eliminator 39, meter 40, cut-off valve 41, valve control mechanism 249, and hose 42 are carried by the semi-trailer unit.

Connected to the cut-off valve 41 is a discharge line 42 which preferably takes the form of a flexible hose and is adapted to be carried on the semi-trailer for connection to a lead-in pipe 50 of a stationary tank 51 into which the liquid from the tank truck is adapted to be discharged. For this purpose a separable coupling 49 is provided for connecting the pipe or hose 42 to the inlet pipe 50.

The semi-trailer unit 22 is provided with the usual compartment or cabinet 52 in which the discharge manifold 36, the strainer 38, air eliminator 39, meter 40, shut-off valve 41, and discharge hose 42 are housed, the compartment being provided with the usual doors 53 by which access may be obtained to the interior of the compartment. The strainer 38, air eliminator 39, meter 40 (which includes a counter 40a) and cut-off valve 41, as well as the actuating mechanism (hereinafter described) for the cut-off valve preferably all are assembled to form a unitary structure as shown.

The strainer 38 may be of any suitable conventional construction and is disposed in a casing 120 having its inlet adapted to be connected to pipe 37 forming a portion of the line in which the apparatus is connected and its outlet connected to the inlet of the casing 121 of the meter 40. Removably disposed in the casing 120 is a basket 122 (see FIG. 5) of conventional form. The front of the casing is provided with an opening 123 through which the basket may be removed and which is closed by a cover plate suitably secured in place as by interrupted threads (not shown). The strainer 38 serves the conventional purpose of straining out from the liquid any solid particles such as grit or dirt or the like.

Disposed above and connected to the strainer casing is an air eliminator 39 the purpose of which is the removal from the line of any air or other gas which may enter the line so that no air or other gas passes through the meter, whereby the meter accurately meters the liquid passing through the line.

The air eliminator preferably is formed as disclosed in the copending application of Henry Robert Billeter and George B. Richards, filed June 1, 1955, Serial No. 512,-551 now abandoned and replaced by continuation application Serial No. 775,077 and divisional application Serial No. 775,045, both filed November 19, 1958.

The air eliminator 39 includes a casing 130 defining a float chamber 131 (see FIGS. 7 and 8) which is in communication at its lower end with the interior of the strainer casing 120 through openings 133 formed in a plate 134 secured in the casing 130 for a purpose which will appear hereinafter. The air eliminator casing 130 is secured to the casing 120 in sealing relation therewith.

The casing 130 is provided at its upper portion with openings 139a and 139b at opposite portions thereof, which openings are closed by end plates 140a and 140b respectively secured to the casing and provided with openings 142a and 142b into which are threaded pipes 143 and 144.

The pipe 143 leads to the cylinder 256 of the valve control mechanism 249 and the pipe 144 leads into one of the tank compartments 33 and is provided with a check valve 144a, all for a purpose hereinafter explained.

Secured between the casing 130 and each of the end plates respectively are orifice plates 145a and 145b provided with elongate orifices 146a and 146b respectively. The end plates 140a and 140b are recessed and provide with the respective orifice plates 145a and 145b, chambers 147a and 147b which communicate with the float chamber through the orifices 146a and 146b, except when the latter are closed by the valves hereinafter described.

Suitably secured in place against the inner faces of the orifice plates 145a and 145b are cover gaskets 160a and 160b, formed with orifices 161a and 161b corresponding in shape to the orifices 146a and 146b. The cover gaskets are formed from a suitable resilient material, such as plastic, which is sufficiently resilient to provide an effective seal between the respective members and which is resistant to the liquid with which the air eliminator is adapted to be used. Ring gaskets 162a and 162b, preferably of similar material, are provided between the casing 130 and end plates 140a and 140b respectively.

The chambers 147a and 147b are connected by a passage 148 formed in the upper portion of the casing 130. The orifice plate 145b is provided with a corresponding opening 149 (see FIG. 11) registering with the passage 148, and the gasket 160b is provided with a similar opening (not shown), whereby to permit communication between the chambers 147a and 147b.

A flap or reed valve 163 is secured to the orifice plate 145a which permits air to flow through the passage 148 from the chamber 147a to the chamber 147b but prevents reverse flow of air, for a purpose which will hereinafter appear.

The orifices 146a and 146b are adapted to be closed by valves 151a and 151b which are similar in construction and accordingly only one of the valves and the associated portions of the air eliminator will be described in detail. When the valves are in open position, the float chamber 131 communicates with the pipe 143 through the left hand orifice 146a and with the pipe 144 through the right hand orifice 146b.

The valve 151a takes the form of an elongated flat strip of flexible, resilient material, preferably metal, which is inert to the liquid with which the air eliminator is adapted to be used. While any spring material having suitable flexibility, resiliency and inertness may be used, I have found that a spring steel alloy sold under the name "Elgiloy" provides excellent results.

The valve 151a is of sufficient width to extend across and completely close the orifice 146a when the valve is in closed position and is of sufficient length to permit it to be mounted and actuated as hereinafter described.

The valve strip or element 151a is rigidly secured suitably to the casing at a point below the orifice 146a and in such position that the adjacent portion of the strip lies against the inner face of the cover gasket 160a at all times.

The other end of the valve element or strip 151a is attached as by a rivet 180 to a tubular stem 170 forming a portion of a float 172. The stem 170 extends through and is sealingly secured in the "ball" portion 173 of the float and projects therefrom at each end. The stem 170 is hollow and receives an upstanding guide post 174 which is rigidly secured in and upstanding from the plate 134. The stem 170 thus serves to guide the float 172 for movement in a vertical direction within the float chamber 131.

The other valve element 151b is secured to the casing and to the stem 170 in a similar manner but reversed position so that it is positioned against the inner face of the gasket 160b and the two valve elements 151a and 151b mutually abut at their portions adjacent the ends which are secured to the stem 170.

Each of the valve elements 151a and 151b is so secured to and supported by the casing 130 and the float 172 that in all positions thereof throughout its range of movement from its lower, open position (as shown in broken lines in FIG. 7) to its upper, closed position (as shown in full lines in FIG. 7), it has a free portion extending between the portion which bears against the face of the orifice plate and the portion which bears against the other valve element, which free portion is bent back upon itself and assumes a curved shape. The free portion retains the same curvature in all positions of the float. This is effected by attaching the valve element, only at its ends, to the casing and float respectively and providing for movement of the float in a direction parallel to the face of the orifice plates.

The two valve elements 151a and 151b are connected to the casing 130 and to the stem 170 at diametrically opposite points whereby the two valves 151a and 151b are disposed in opposition. Accordingly, they exert on the stem 170 and accordingly on the float 172 equal and opposite forces so that the float normally is freely supported by the valve elements 151a and 151b in the float chamber and does not bear against the guide stem 174. The guide stem 174 however is provided so as to insure true vertical movement of the float 172 in a direction parallel to the faces of the orifice plates 145a and 145b.

Since the assembly consisting of the valve elements 151a and 151b, and the float 172 is freely supported, the forces exerted by the respective valve elements 151a and 151b against their respective orifice plates 145a and 145b (that is, against the gaskets 160a and 160b) are equal and the valves, therefore, are completely balanced against each other.

Moreover, the arrangement is such that each of the valves 151a and 151b is under stress throughout its entire range of movement, which stress causes the valve to be urged against its orifice plate throughout at least a portion of the valve during its entire range of movement. As will be seen from the drawings, when the float is in its lower position the valves 151a and 151b bear against the faces of their respective orifice plates 145a and 145b throughout only the lower portions of the valves and at an area on each of the orifice plates below the orifices 146a and 146b. However, as the float 172 rises to its upper position, as established by the abutment of the lower inturned end of the stem 170 against a stop 175 formed in the upper end of the stem 174, the valves 151a and 151b bear against their respective orifice plates at portions entirely surrounding the orifices in order to provide complete closures for the two orifices 146a and 146b. Thus it will be seen that valve elements 151a and 151b are urged into their positions closing and sealing the orifices 146a and 146b by the resilience of the valve elements 151a and 151b themselves.

Assuming that the gas has been removed and liquid stands in the air eliminator 39 at a level sufficient to raise the float to its uppermost position, the valves 151a and 151b are in closed positions. Thus the valves lie against their respective orifice plates 145a and 145b and extend entirely over and sealingly close the respective orifices 146a and 146b so that no liquid can escape from the head.

It will be noted that the valves 151a and 151b lie flat against their respective orifice plates throughout a substantial zone thereof and particularly a zone on both sides of and above and below the orifices 146a and 146b so that the latter are fully closed. As noted above, the spring pressure of the valves 151a and 151b provided by reason of their bowed or curved form insures that the closing portions thereof are maintained against their respective orifice plates regardless of the presence of any air or liquid pressure within the float chamber 131.

When gas enters the float chamber 131 from the strainer casing, such air displaces the liquid in the float chamber 131 and causes the level to fall. When this occurs, the float 172, which is buoyantly supported by the liquid, also falls and carries with it the stem 170 to which the valves 151a and 151b are attached. The downward movement of the stem 170 causes the ends of the valves 151a and 151b attached thereto to move downwardly in a direction parallel to the faces of the orifice plates with the result that the portions of the valves 151a and 151b which previously lay against the orifice plates are stripped or "peeled" away from the orifice plates 145a and 145b progressively downwardly, and as the downward movement of the float continues the orifices 146a and 146b are progressively uncovered in a direction from the upper portions thereof toward the lower portions.

As soon as the orifices 146a and 146b have been uncovered by the above-described opening movement of the valves 151a and 151b, the gas trapped in the float chamber 131 above the level of the liquid in the system and which normally is under some pressure is caused to flow out of the float chamber through the orifices 146a and 146b and the pipes 143a and 144 for a purpose which will hereinafter appear.

When the gas has been discharged to such an extent that the liquid level rises sufficiently to support and lift the float 172, the latter is elevated and causes the valves 151a and 151b to be moved in a reverse direction to that described above in connection with the opening of the valve. That is to say, that as the float 72 moves upwardly the valves are caused to progressively move against their respective orifice plates to an increasing degree and to progressively close their respective orifices until the orifices are completely closed and the valves extend in contact with their respective orifice plates both above and below the orifices. When the valves are closed, no further gas can escape from the float chamber 131.

The meter 40 may be any suitable form of meter for measuring the flow of liquids therethrough, but I prefer to employ a meter such as shown and described in my copending application Serial No. 522,930, filed July 19, 1955, now Patent No. 2,835,229, dated May 20, 1958, to which reference may be made for a more detailed disclosure of the meter.

Briefly, the meter 40 includes the hollow casing 121 having an inlet port 180 connected to the outlet of the strainer casing 120, and an outlet port 181 leading to the casing 182 of the shut-off valve 41. The casing 121 has a pair of semi-cylindrical, rotor-sealing wall portions 183 and 184 defining inlet and outlet cavities or chambers 185 and 186 which are in free communication. The casing 121 also has a blocking wall portion 187 extending between the inlet and outlet ports 180 and 181 on the opposite side of the casing from the rotor-sealing wall portions 183 and 184.

A pair of displacement rotors 190 and 191 which also are referred to as "inlet" and "outlet" rotors, respectively, are rotatably mounted in the casing 121 in position to pass in sealing relation with the wall portions 183 and 184 for approximately 180° of their rotation respectively. Rotatably mounted in the casing 121 is a blocking rotor 192 having oppositely disposed peripheral, sealing wall portions 193a and 193b of convex circular form positioned to pass alternately in sealing relation with the blocking wall portion 187. The blocking rotor 192 is provided intermediate the peripheral portions 193a and 193b with deep recesses 194a and 194b adapted to permit the displacement rotors 190 and 191 to pass successively therethrough during the rotation of the rotors as hereinafter explained. The blocking wall portion 187 is of such dimension relatively to the peripheral portions respectively of the blocking rotor that a complete seal is provided between the blocking wall portion 187 and the blocking rotor 192 at all times during the rotation of the blocking rotor. That is to say, either one or the other of the peripheral or blocking surfaces 193a and 193b of the blocking rotor 192 is always in sealing engagement with the blocking wall portion 187.

The peripheral portions 193a and 193b which also serve as sealing portions of the blocking rotor 192 are disposed to pass in sealing relation with the displacement rotors 190 and 191 when the latter are in sealing relation with their respective sealing wall portions 183 and 184 so that the blocking rotor 192 and the respective one of the displacement rotors provide a three point seal with each other and with the casing, namely, a seal between the displacement rotor and its corresponding sealing wall portion, between the displacement rotor and the corresponding portion of the blocking rotor, and between the other peripheral or sealing portion of the blocking rotor and the blocking wall portion of the casing.

The two displacement rotors 190 and 191 are drivingly connected to the blocking rotor 192 by gears (not shown) in such angular relation that the rotors rotate simultaneously in a fixed phase relation whereby first one and then the other of the displacement rotors is in sealing relation with its corresponding sealing wall portion of the casing and simultaneously in sealing relation with the blocking rotor, while the other displacement rotor is in spaced relation with the casing and with the blocking rotor. It will be noted that the recesses 194a and 194b of the blocking rotor are of such depth and peripheral extent as to permit the respective displacement rotors to pass therethrough freely and without any sealing effect.

The blocking rotor 192 is connected to and drives a shaft 195 which is drivingly connected to a counter 40a mounted on the meter casing and which serves to count the revolutions of the blocking rotor and thus indicate the volume of liquid which passes through the meter. The counter 40a may be of any suitable construction and the details thereof form no part of the present invention.

The operation of the meter is as explained more in detail in my copending application above referred to. Briefly, liquid flows into the meter casing through the inlet 180 and out of the outlet 181. In passing through the casing the liquid causes the displacement rotors 190 and 191 to be rotated and, since they are connected to the blocking rotor, the latter is rotated at an angular velocity and angular relationship relatively to the displacement rotors determined by the gearing. In the present illustrative embodiment of the meter the gearing is so selected and arranged that the blocking rotor is rotated at an angular velocity of one-half that of the displacement rotors.

During each cycle of operation the inlet rotor 190 first closes the cavity 185 by engagement with the sealing wall surface 183 and with one of the sealing surfaces of the blocking rotor 192 and then sweeps around the sealing wall surface 183 in sealing relation therewith. During this portion of the cycle the outlet rotor 191 passes through one of the cavities in the blocking rotor in spaced relation to the blocking rotor and in spaced relation to the sealing wall surface 184 so that this rotor is not in a sealing or active phase. When the inlet rotor 190 reaches the end of the sealing wall surface 183 and just as it breaks the seal with that surface and with the blocking rotor 192, the outlet rotor 191 engages the sealing wall surface 184 in sealing relation and also the blocking rotor 192 in sealing relation with one of the sealing surfaces thereof. Thus, as the seal between the inlet rotor 190 and the casing and the blocking rotor is broken, the seal between the outlet rotor 191 and the casing and with the blocking rotor is made.

It will be seen, therefore, that during each complete revolution of one of the displacement rotors a volume of liquid is displaced which is equal to twice the effective volume of one or the other of the cavities and since each displacement blade sweeps its cavity twice during a full cycle of the meter (that is, one revolution of the blocking rotor), it follows that a quantity of liquid is displaced during each cycle of the meter equal to four times the effective volume of one of the cavities.

Referring now particularly to FIGS. 12 to 15, there is illustrated the cut-off valve 41, in which views the valve is shown in closed position contrary to the showing in FIG. 16 in which the valve is shown in open position. The function of this valve is to shut off the flow of liquid through the meter whenever air enters the line in which the meter is connected in order to prevent a false reading of the amount of the liquid passing through the meter, which would result if air were permitted to pass through the meter. The cut-off valve 41 may be of any suitable construction but preferably is a balanced valve embodying certain principles of the valve disclosed and claimed in my copending application, Serial No. 390,874, filed March 9, 1954, now abandoned.

The cut-off valve 41 includes a hollow casing 200 having an inlet 201 connected to the outlet 181 of the meter and an outlet 202 connected to the discharge hose 42. The valve housing 200 preferably is formed by an inlet section 203, a seat member 204 providing a valve seat and an outlet section 205 defining a chamber 211, the sections being suitably secured together as by bolts 206. The joints between the housing section are sealed as by O rings 208 and 207.

The valve seat member 204 is provided with a passage 210 therethrough which connects the inlet 201 with the chamber 211 of the outlet section 210 from which leads the outlet 202. A cylindrical valve guide 212 is rigidly supported in the chamber 211, as by a hollow post 213 secured in the inlet section 203. A generally cup-shaped valve element 214 is supported on the valve guide 212 for vertical sliding movement thereon between a position wherein the lower end of the valve element 214 closes against the seat member 204 and a position wherein the valve element 214 is raised above the valve seat member 204 and liquid is permitted to pass between the valve seat section and the valve element 214.

For the purpose of providing an effective seal between the valve element 214 and the valve seat member 204, the latter is provided with an upturned lip 204a surrounding the opening 210 and having an annular groove 216 in which is recessed an O ring 217 providing a seal between the valve element 214 and the seat member 204 when the valve element 214 is in its lower, closed position. The end edge or face of the valve 214 is inclined at an angle of 45° so that the end of the valve 214 rides over the O ring readily in moving into closed position.

The valve element 214 is sealingly supported on the valve guide 212 so that when the valve element 214 is in sealing relation against the valve seat member 204 no liquid can pass from the interior of the valve element 214 below the valve guide 212 and into the chamber 211. To this end a seal comprising an O ring 218 seated in a groove in the valve guide 212 is provided.

The valve element 214 is normally urged into closed position against the valve seat member 204 by a coiled spring 219 which is seated at one end against the top of the casing section 205 and at the other end against a flange 220 formed on the outer portion of the valve element 214.

The valve element 214 is provided with a plurality of openings 221a in its upper wall for the purpose of permitting liquid to flow freely through the upper wall and thus prevent the establishment of a vacuum between the valve 214 and the valve guide 212 when the valve element 214 is lifted.

Slidably guided in the post 213 for vertical movement therein is a valve actuating rod 221 which extends through the bottom wall of the casing section 203 and is sealed therein as by a seal 222. The rod 221 is adapted to be raised by a crank 223 pivotally supported by a pin 224 in a bracket 225 fixed to the casing of the valve 41.

The rod 221 at its upper portion projects from the valve guide 212 and abuts the upper wall 227a of the valve 214 whereby upon upward movement of the rod 221 the valve 214 is raised.

The valve guide is provided with an upwardly opening recess having a lower, enlarged portion 226 and an upper reduced portion 227. Carried on the rod 221 is a washer 228 formed of flexible resilient material and dimensioned to have a sliding fit in the upper portion 227 of the recess. The washer 228 is supported on the rod 221 as by a split ring 229 and its upward movement relatively to the stem is limited by a flange 230 on the rod. The washer 228 is provided with a plurality of openings 231 providing passages therethrough for a purpose which will now appear.

In operation of the valve 41, the valve is opened by rocking the crank 223 in a clockwise direction which raises the valve element 214 away from the seat member 204, and the valve element is held in open position until released (all as hereinafter explained). At the same time the washer 228 is moved into the reduced portion 227 of the recess. When the valve element is released, it is moved toward closed position by the spring 219. The washer 228 cooperates with the recess portions 226 and 227 to provide an action in the nature of a dash pot action, thereby to retard the closing movement of the valve element. In this connection, it will be noted that the liquid in the recess portion 226 is permitted to pass through the openings 231 in the washer 228 into the recess portion 227 so that the closing of the valve is not prevented.

Means are provided for automatically permitting the closing of the valve 41 to cut off further flow of liquid through the meter whenever gas enters the line and accumulates in the air eliminator in such quantity as to cause opening of the valves thereof. Thus, gas is prevented from passing through the meter and causing a false indication of the volume of liquid passing through the meter.

As stated above, the cut-off valve 41 is so constructed that the valve is normally urged toward closed position. However, we provide valve control mechanism 249 for holding the valve in open position during normal operation of the system. Such mechanism is arranged to operate to permit the valve to close whenever gas enters the system. In FIG. 16 the mechanism is shown in the position corresponding to the open position of the valve.

To the foregoing end a latch rod 250 is pivotally connected to the crank 223 and is slidably guided in a portion 251 of the frame and is formed adjacent the other end with a latching notch 252. A dog 253 is pivotally mounted on the frame in position to engage the notch 252 and is suitably urged in a counterclockwise direction as by a spring 254 bearing against a fixed clip 255 to maintain engagement with the latch 252 and hold the rod 250 and connected crank 223 in such a position (as shown in FIG. 14 for example) that the valve 214 is maintained in its open position.

A latch tripping means is mounted adjacent the latch 253 and includes a closed cylinder 256 in which is slidably disposed a piston 257 which carries a latch tripping rod 258 projecting through an opening 260 in the cylinder end wall, which opening vents the corresponding side of the cylinder to atmosphere. The rod 258 is pivotally connected to a link 271, which in turn is pivotally connected to one arm of a Y cam 272 pivotally connected at its center to the free end of the latch dog 253 and having its free camming arms bearing against a fixed clip 262. The cam 272 is arranged to rotate the latch 253 in a clockwise (unlatching) direction when the piston 257 is moved in an appropriate direction (to the right as viewed in FIG. 16). The cylinder 256 on the right hand side of the piston 257 is vented through the opening 260. The arrangement is such that the latch dog 253 normally is urged into latching position by the spring 254 and the piston 257 is positioned midway of its stroke in the cylinder 256. The latch dog 253 is moved out of its latching position, or "tripped" when pressure is applied to the cylinder through the pipe 143 which is connected to the "pressure" side of the cylinder.

In lieu of the piston 257 a flexible diaphragm (not shown) suitably secured in the casing 286 may be employed to perform the function of the piston.

The crank 223 is provided with a reset arm 261 by which it may be reset manually after the latch has been tripped.

Under normal conditions of operation only liquid passes through the line and there is no gas passing therethrough. Accordingly the latch after having been moved to latching position, remains in such position and the cut-off valve is held in open position to permit liquid to pass therethrough.

When there is no gas passing through the line, the float 172 of the air eliminator remains in its upper position and the air eliminator valves 151a and 151b remain closed. The pressure of the fluid in the air eliminator chamber 131 is equal to the sum of pressure in the tank 24 plus the pressure resulting from the static head of the liquid less the pressure losses in the line. The pressure in the air eliminator chamber 147b and the pipe 144 is at least equal to atmospheric pressure and may be as great as the pressure in the tank 24. The gas in the chamber 147a, the pipe 143 and the cylinder 256 is at atmospheric pressure. However, the reed valve 163 prevents any back flow of gas from the chamber 147a to the chamber 147b.

Should any gas enter the line, it rises in the float chamber 131 of the air eliminator 39 and consequently dos not pass through the meter 40. The gas which collects above the liquid in the float chamber is, of course, at the same pressure as that of the liquid in the line.

As gas collects in the float chamber 131, the float 172 descends accordingly until it reaches a point at which it causes the valves 151a and 151b to open. Upon the opening of the valves 151a and 151b the pressure that has been built up on the gas in the float chamber is suddenly transmitted to the cylinder at the "pressure" side of the piston 257. This sudden pressure is sufficient to move the piston 257 to trip the latch 253 and permit the valve 41 to close, thereby preventing further flow of liquid or gas through the line.

It should be noted at this point that the apparatus is so designed that the air eliminator valves open to actuate the tripping mechanism and permit the cut-off valve to close before any gas passes through the meter.

Gas passes out of the air eliminator through the pipe 144 and is discharged into the tank 24. When liquid flow is again established in the line, the float 172 again rises to close the valves 151a and 151b. The check valve 144a prevents any reverse flow of gas from the tank 24 to the air eliminator 39. The valve 41 is then opened and the latch 253 reset to hold the valve 41 open, which operation is performed by manually rotating the crank in a clockwise direction. The pressure created in the cylinder 256, the pipe 143 and the chamber 147a by the resetting of the latch 253 is relieved through the passage 148, and the reed valve to the chamber 147b.

It will be understood that when liquid flow is reestablished in the line, the gas which is trapped in the manifold and the line gravitates upwardly out of the pipe 144. The handle 223 will not latch open until such gas is eliminated from the manifold and line and the air eliminator valves are closed.

It will be seen that the arrangement is such that there is no possibility of losing the pressure on the tank 24 by reason of the complete emptying of a compartment of the tank. Whenever all of the liquid passes from the compartment and gas enters the line, this causes the air eliminator 39 to open and cause the cut-off valve 41 to close. Gas discharged from the air eliminator to the cylinder 256 is trapped therein. Gas discharged from the air eliminator through the pipe 144 is returned to the tank 24, and back flow from the latter is prevented by the check valve 144a.

In the operation of the apparatus in accordance with my invention, the apparatus is connected in the liquid line (not shown) and a valve or other control means (not shown) actuated to permit the liquid to be measured to flow through the apparatus.

As the liquid flows through the strainer 38 any solid impurities are removed by the strainer and the liquid passes therefrom free of such solid particles.

The liquid then flows through the meter 40 and causes the rotors to be rotated which, as above explained, effect rotation of the counter and thereby provides an indication of the quantity of liquid which flows through the meter. So long as only liquid and no gas flows through the line the shut-off valve 41 remains open and the liquid may flow freely. On the other hand, should any gas enter the line, it will, as above explained, enter the float chamber of the air eliminator 39 and when sufficient gas has collected therein, the air eliminator valves will open to actuate the trip mechanism 249 to allow the shut-off valve 41 to close and thereby prevent any likelihood of the gas passing through the meter and causing a false indication on the counter. When this occurs and after the air has been exhausted from the air eliminator and the latter is closed, the operator resets the shut-off valve in open position, whereupon the flow of the liquid continues.

Application of my invention to a tank discharging system in which the discharge of the liquid is aided or effected by a pressure pump is illustrated in FIG. 17 of the drawings to which reference now is made.

In the system illustrated, a tank 300 is provided which is divided into a plurality of compartments 301, each of which is vented to atmosphere to a suitable vent pipe 302. The several compartments 301 respectively are connected by outlet pipe 303 to manifold valves 304 which in turn are connected to a single outlet pipe 305 which leads to a pump 306 of any known construction suitable for forcing liquid through the discharge line as hereinafter explained.

The outlet pipe 305 is connected to an assembly 307 which for the purpose of illustration is similar to the corresponding assembly illustrated particularly in FIGS. 1, 3 and 4 of the drawings and described in connection with the first embodiment of the invention. The assembly 307 includes a strainer 308, an air eliminator 309, a meter 310, a cut-off valve 311 and a valve control mechanism 312, all of which elements are constructed and function in a manner similar to the corresponding elements of the assembly in FIG. 1, except as hereinafter pointed out.

The outlet of the cut-off valve 311 is connected to a discharge line 313 to which is attached a faucet 314. One side of the air eliminator 309 is connected by a pipe 315 to the cylinder of the valve control mechanism 312 in a manner similar to that shown in FIG. 16. Leading from the other side of the air eliminator is a vent pipe 316 which terminates in one of the compartments 301 above the level of the liquid therein for a purpose which will hereinafter appear. A check valve 317 is provided in the vent pipe 315, so arranged as to prevent the flow of air therethrough in a direction from the tank toward the air eliminator.

When the tank 300 is to be discharged, the appropriate valve 304 is opened and the pump 306 energized to withdraw liquid from the compartment and pump it through the strainer, meter, cut-off valve and discharge line, when the faucet 314 is opened. Should any air or other gas enter the line ahead of the air eliminator, it will rise in the air eliminator chamber in a manner similar to that hereinabove described, and when sufficient air or gas has accumulated in the chamber the air eliminator valves open and gas passes through the pipe 315 to actuate the valve control mechanism and trip the same to allow the cut-off valve to close, thus halting further flow of liquid through the line. Air is discharged from the air eliminator through the vent pipe 316 into the compartment 301 until the operator closes the empty compartment manifold valve and opens the manifold valve of a compartment containing liquid.

The arrangement shown in FIG. 17 is capable of discharging liquid to a tank or container below, or above or at the same level as the tank 300.

Figure 18:
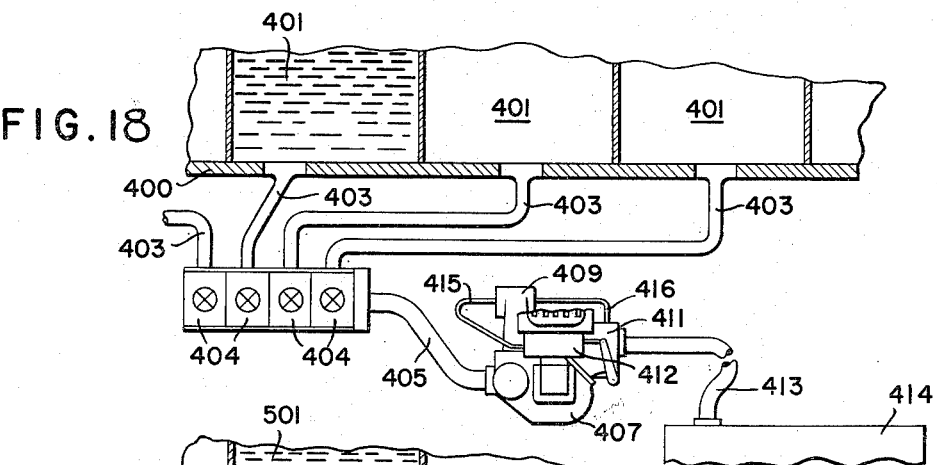
FIG. 18 is a view similar to FIG. 17, but showing a system wherein the force of gravity alone is employed to cause the flow of liquid.

A system wherein the tank is discharged solely by gravity is illustrated in FIG. 18 of the drawings to which reference now is made. The tank 400 is provided with compartments 401 which are vented in a manner similar to the compartments 301 hereinabove described and are connected through pipes 403 to manifold valves 404. The manifold valves are connected by an outlet pipe 405 to an assembly 407 which is similar to the assembly 307 except as hereinafter explained and the cut-off valve 411 thereof is connected to a discharge line 413 leading to a tank 414 into which the liquid is to be discharged and which is located at a level sufficiently below the tank 400 to allow liquid to be discharged by gravity. The air eliminator 409 is connected at one side through a pipe 415 to the valve control device 412 and at the other side through a pipe 416 to the discharge side of the cut-off valve 411.

In the operation of the system shown in FIG. 18 the tank is discharged by opening the selected manifold valve 404, whereupon the liquid flows by gravity from the corresponding compartment 401 through the corresponding outlet pipe 403 and the outlet pipe 405 and through the assembly 407 and line 413 to the tank 414. Whenever air or other gas is present in the line and collects in sufficient quantities in the chamber of the air eliminator 409, the air eliminator valves are opened and the piston of the mechanism 412 is exposed to less than atmospheric pressure and thereupon operates to close the cut-off valve 411 and halt further flow of liquid to the line. The opening of the air eliminator establishes a connection from the pipe 405 to the line 413 by-passing the valve 411 (as well as the meter 412) which serves to break the vacuum in the discharge line 413, so that the liquid in the line beyond the cut-off valve 411 continues to flow at least until the air in the system has been withdrawn such an extent that the air eliminator valves again close.

Figure 19:
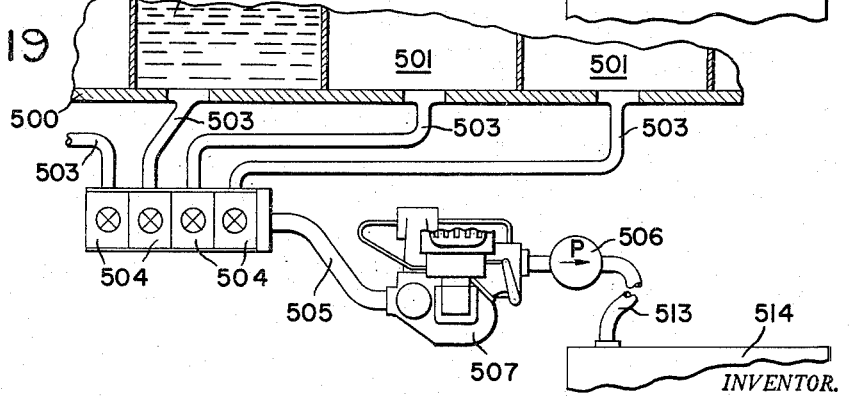
FIG. 19 is a view similar to FIG. 16 but showing a system wherein pump suction is employed for producing the flow.

Referring now to FIG. 19 there is illustrated a system wherein the liquid is withdrawn from the tank by the action of a pump which creates suction on the liquid within the tank, which pump serves to aid the action of gravity in discharging the tank or serves as the sole means for withdrawing the liquid from the tank.

The tank 500 is similar to the tank 400 and preferably is provided with individual compartments 501 each of which is vented to the atmosphere and is provided with outlet pipes 503 for withdrawing liquid therefrom which latter pipes are connected to manifold valves 504. The manifold valves are connected to a single outlet pipe 506 which in turn is connected to an assembly 507 similar to the assembly 407 hereinabove described. The assembly 507 is provided with a discharge line 513 for discharging to a tank 514 and a pump 505 is connected in the discharge pipe 513 for creating a suction to withdraw the liquid from the tank 500.

The system illustrated in FIG. 19 is the same in all respects to the system illustrated in FIG. 18 and above described except that the pump 505 is inserted in the discharge line 513 and serves to effect the withdrawal of the liquid from the tank so that it may be withdrawn even though the tank 514 into which the liquid is to be discharged is above the level of the tank 500 and therefore it is not necessary to rely upon the action of gravity to discharge the tank 500. This system functions in a manner similar to that of the system shown in FIG. 18.

It will be understood that while I have shown and described a meter in the liquid line, the meter may be omitted. There are numerous applications of my invention in its broader aspects wherein it is not desired to measure the flow, but where it is desirable, for reasons referred to hereinbefore, to insure that no air or other gases pass through the line. It will be understood that my shut-off mechanism functions in a manner similar to that described in a system where no meter is employed. In such a system the cut-off valve is connected directly to the casing on which the air eliminator head is located. In this system, the cut-off mechanism serves to prevent the passage of air or other fluid through the line, with all the resultant advantages herein explained, except that of preventing an incorrect indication by the meter.

It will be understood that instead of providing a single air eliminator having a single inlet and a pair of outlets one connected to the tank to discharge air from the line into the tank and the other connected to the control cylinder, I may provide in lieu thereof two separate air eliminators (not shown) each of the single outlet type connected in such a manner as to perform the functions of the single air eliminator shown.

While I have described the functioning of the apparatus in collecting and discharging air or other gas and for preventing the passage of the same through the line, it will be understood that it is also well adapted to prevent the passage of and to discharge a lighter and immiscible liquid.

It will be seen that my invention provides apparatus halting the flow of liquid through a line whenever air or other gas or a second lighter and immiscible liquid enters the line. The apparatus automatically operates to collect and discharge the second fluid from the line and to prevent it from passing beyond the air eliminator.

The cut-off means is automatically actuated by the presence of air or gas in the line, and therefore it does not require any attention except that in the embodiment of the invention shown it must be reset after it has operated to cut off the flow of liquid through the line.

The apparatus, when a meter is included therein, provides means for accurately measuring the amount of liquid passing therethrough. The cut-off means prevents the passage of air or other fluid through the meter so that there is no likelihood of any false indication such as might otherwise result owing to the passage of the air or other gas through the meter.

The apparatus is relatively simple and therefore may be manufactured and assembled relatively inexpensively. Moreover, the apparatus is such that it may be installed in any line without the necessity for reconstructing or substantially modifying the structure of the line. The apparatus is simple and positive in action, and requires a minimum of servicing and attention and a minimum of repair or replacement of parts over a long period of use.

The apparatus is simple, light and compact, and therefore where installed in a truck or truck-trailer does not add greatly to the weight of the truck or truck-trailer combination. Moreover, it requires only a relatively small space for installation and therefore does not in any way encumber the truck or truck-trailer combination on which installed or interfere in any way with the normal and usual mode of operating such vehicles. It will be understood that the apparatus is also well adapted for use in a stationary installation. Also its use is not limited to discharging a portable tank into a fixed tank but may be employed in discharging one portable tank into another, or a fixed tank to a portable tank.

Among the other advantages of the invention is its function of maintaining the pressure on the several compartments of a pressurized tank such as in the embodiment shown in FIGS. 1 to 15. Thus should the operator fail to close the manifold valve of a compartment when all of the liquid has been withdrawn therefrom, the apparatus will operate to close the line and prevent the passage of gas through the discharge line.

Other advantages of the invention are that it imposes no additional pressure loss in the line; it operates equally well with gravity, pump suction, pressurizing or pump discharge of the tank; it does not increase the net weight or size of the meter cut-off mechanism combination; is fluid tight; requires no linkage immersed in the product which may become corroded, gummed or inoperative; is not adversely affected by turbulent flow; provides a positive action to close the line when air or other gas enters the line; is free of wire drawing, vaporization and consequent inaccuracy; interposes no obstruction to the normal function of the preset valve; is not dependent upon the specific gravity of the product; and serves to relieve the "sun pressure" or increase in pressure due to rise in temperature of the fluid within the line.

This application is a continuation of my copending application Serial No. 553,506, filed December 16, 1955, now abandoned.

I claim:

1. Apparatus for controlling the flow of a primary fluid in liquid form through a conduit comprising a cut-off valve in the conduit, means constantly urging said valve toward closed position, means for releasably holding said valve in open position, collection and discharge means for collecting a second fluid immiscible with and lighter than said primary fluid, said collection and discharge means including a chamber connected to said conduit ahead of said valve and having an outlet, a discharge valve controlling the discharge of said second fluid from said chamber through said valve, a float in said chamber, means connecting said float and said discharge valve whereby to discharge said second fluid upon the collection of a predetermined quantity thereof in said chamber and means actuated by the pressure of said second fluid discharged from said collection and discharge means for releasing said holding means.

2. Apparatus for controlling the flow of liquid through a conduit comprising a cut-off valve connected in said conduit for closing said conduit, and normally urged toward closed position, means releasably holding said valve in open position, means actuated by the pressure of gas discharged from the conduit ahead of said valve for releasing said holding means, and means for discharging gas from the conduit ahead of said cut-off valve to thereby actuate said releasing means, said last means including a float chamber having an inlet connected to said conduit ahead of said valve and an outlet connected to said releasing means, a control valve controlling said outlet, a float in said chamber, and means connecting said float and said control valve for closing said control valve when the liquid in said chamber rises above a predetermined level and for opening said control valve when said liquid falls below said level.

3. Apparatus for controlling the flow of liquid through a conduit comprising a cut-off valve connected in said conduit for closing said conduit, and normally urged toward closed position, means releasably holding said valve in open position, means actuated by the pressure of gas discharged from said conduit ahead of said valve for releasing said holding means, and means for discharging gas from the conduit to thereby actuate said releasing means, said last means including a housing defining a float chamber connected to the conduit ahead of said valve, a pair of outlets leading from said float chamber, one connected to said releasing means and the other discharging to atmosphere beyond said cut-off valve, a control valve controlling each of said outlets, a float in said chamber, and means connecting said float to said control valves for closing said valves when the liquid in said chamber rises above a predetermined level and for opening said valves when said liquid falls below said level.

4. Apparatus for controlling the flow of a primary fluid in liquid form through a conduit comprising a cut-off valve connected in said conduit for closing said conduit, and normally urged toward closed position, means releasably holding said valve in open position, means actuated by the pressure of a secondary fluid immiscible with and of a different specific gravity than the primary fluid discharged from the conduit ahead of said valve for releasing said holding means, and means for discharging said secondary fluid from the conduit to thereby actuate said releasing means, said last means including a float chamber having an inlet connected to said conduit ahead of said valve and an outlet connected to said releasing means, a control valve controlling said outlet, a float in said chamber, and means connecting said float and said control valve for actuating said control valve when the primary fluid in said chamber reaches a predetermined level in said chamber.

5. Apparatus for controlling the flow of a primary fluid in liquid form through a conduit comprising a cut-off valve connected in said conduit for closing said conduit and normally urged toward closed position, means including a latch releasably holding said valve in open position, means actuated by the pressure of a secondary fluid immiscible with and of a different specific gravity than the primary fluid discharged from said conduit ahead of said valve for tripping said latch, and means for discharging said secondary fluid from the conduit to thereby actuate said latch-tripping means, said last means including a housing defining a float chamber connected to the conduit ahead of said valve, a pair of outlets leading from said float chamber, one connected to said releasing means and the other discharging to atmosphere beyond said valve, a control valve associated with each of said outlets, a float in said chamber, and means connecting said float to said control valves for actuating said control valves when the primary fluid in said chamber reaches a predetermined level.

6. In a liquid transmission system having means for creating a pressure differential therein for inducing transmission of a primary liquid, means for accumulating foreign fluid immiscible with and having a different specific gravity than said primary liquid and for interrupting liquid transmission in the event of accumulation within said system of a predetermined quantity of foreign fluid; said means including a chamber connected to said system at a point subjected to substantial line pressure differential for collecting foreign fluid by virtue of difference in specific gravity between said primary liquid and said foreign fluid, valve means downstream of said chamber for controlling said liquid transmission, said valve means including a valve, spring means urging said valve closed, latch means releasably holding said valve open, and fluid pressure actuated means for releasing said latch means, a passage for conveying foreign fluid under pressure to said releasing means, a control valve openable to permit the flow of foreign fluid from said chamber to said passage, a float within said chamber of such effective specific gravity as to seek the plane of demarcation between said primary liquid and said foreign fluid, means connecting said float to said control valve whereby said float opens said control valve when said foreign fluid accumulates beyond a predetermined quantity in said chamber, and closes said valve when said foreign fluid decreases below a predetermined quantity, and bleeder means for permitting restricted flow of fluid from said passage to exhaust means.

7. In a liquid transmission system having means for creating a pressure differential therein for inducing transmission of a primary liquid, means for accumulating and exhausting from said system foreign fluid immiscible with and having a different specific gravity than said primary liquid and for interrupting liquid transmission in the event of accumulation within said system of a predetermined quantity of foreign fluid; said means including a chamber connected to said system at a point subjected to substantial line pressure differential for collecting foreign fluid by virtue of difference in specific gravity between said foreign fluid and said primary fluid, a control valve openable to permit restricted flow of foreign fluid from said chamber to exhaust means, valve means downstream of said chamber for controlling said liquid transmission, said valve means being closable by actuation by fluid pressure, a passage for conveying foreign fluid to said valve means, a second control valve openable to permit the flow of foreign fluid from said chamber to said passage, a float within said chamber of such effective specific gravity as to seek the plane of demarcation between said primary liquid and said foreign fluid, means connecting said float to both of said control valves whereby said float opens said control valves when said foreign fluid accumulates beyond a predetermined quantity in said chamber, and closes said valves when said foreign fluid decreases below a predetermined quantity, and bleeder means for permitting restricted flow of fluid from said passage to exhaust means.

8. In combination, a tank for containing a primary fluid in liquid form, a discharge line leading from said tank, a cut-off valve in said discharge line for closing said line, means operative independently of the fluid pressure in said discharge line for closing said cut-off valve, discharge means in said line ahead of said cut-off valve and including a chamber connected to said line for accumulating a secondary fluid immiscible with and of different specific gravity than said primary fluid, valve means for controlling the discharge of secondary fluid from said chamber and float means for actuating said valve means when the primary liquid reaches a predetermined level in said chamber, and means actuated by the pressure of secondary fluid discharged from said chamber for actuating said valve closing means.

9. In combination, a tank for containing a primary fluid in liquid form, means for applying a gaseous pressure on the liquid in said tank, a discharge line leading from said tank, a cut-off valve in said discharge line for closing said line, means operative independently of the pressure in said discharge line for closing said cut-off valve, discharge means in said line ahead of said cut-off valve and including a chamber connected to said line for accumulating a secondary fluid immiscible with and of different specific gravity than said primary fluid and valve means for controlling the discharge of secondary fluid from said chamber, and float means for actuating said valve means when the primary liquid reaches a predetermined level in said chamber, means for returning to said tank secondary fluid discharged from said chamber and means actuated by the pressure of secondary fluid discharged from said chamber for actuating said valve closing means.

10. In combination, a tank for containing a primary fluid in liquid form, a discharge line leading from said tank, a cut-off valve in said discharge line for closing said line, means operative independently of the pressure in said discharge line for closing said cut-off valve, discharge means in said line ahead of said cut-off valve and including a chamber connected to said line for accumulating a secondary fluid immiscible with and of different specific gravity than said primary fluid, control valve means for controlling the discharge of secondary fluid from said chamber, and float means for actuating said control valve means when the primary fluid reaches a predetermined level in said chamber, means for discharging secondary fluid from said chamber into said line on the downstream side of said cut-off valve, and means actuated by the pressure of secondary fluid discharged from said chamber for actuating said valve closing means.

11. In combination, a tank for containing a primary fluid in liquid form, a discharge line leading from said tank, a cut-off valve in said discharge line for closing said line, means operative independently of the pressure in said discharge line for closing said cut-off valve, discharge means in said line ahead of said cut-off valve and including a chamber connected to said line for accumulating a secondary fluid immiscible with and of different specific gravity than said primary fluid, valve means for controlling the discharge of secondary fluid from said chamber, and float means for actuating said valve means when the primary liquid reaches a predetermined level in said chamber, a suction pump in said line on the downstream side of said discharge means, means for discharging secondary fluid from said chamber into said line on the downstream side of said cut-off valve and ahead of said pump, and means actuated by the pressure of secondary fluid discharged from said chamber for actuating said valve closing means.

12. Apparatus for controlling the flow of a primary fluid in liquid form through a conduit comprising a cut-off valve in said conduit for closing said conduit, means operative independently of the pressure in said discharge line for closing said cut-off valve, discharge means for collecting and discharging from said conduit a secondary fluid immiscible with and of a different specific gravity than said primary fluid, said discharge means having a chamber connected to said conduit and a plurality of discharge outlets leading from said chamber for discharging said secondary fluid, discharge valves controlling said outlets, and float means controlling said discharge valves in accordance with the level of the primary fluid in said chamber, means connecting one of said outlets to a point of exhaust for said secondary fluid, and means connecting another of said outlets to said cut-off valve closing means for actuating the latter upon the collection of a predetermined quantity of secondary fluid in said chamber and discharge of secondary fluid from said chamber.

13. The invention as set forth in claim 12 wherein a bleeder bypass around said chamber is provided for connecting said outlets and a check valve is provided in said bypass whereby to bleed fluid from said second connecting means to said first connecting means.

14. Apparatus for controlling the flow of a primary fluid in liquid form through a conduit comprising a cut-off valve in said conduit for closing said conduit, means operative independently of the pressure in said discharge line normally urging said valve toward closed position, means releasably holding said valve in open position, fluid pressure actuated means for releasing said holding means, discharge means for collecting and discharging from said conduit a secondary fluid immiscible with and of a different specific gravity than said primary fluid, said discharge means having a chamber connected to said conduit and a plurality of discharge outlets leading from said chamber for discharging said secondary fluid, discharge valves controlling said outlets and a float controlling said discharge valves in accordance with the level of the primary fluid in said chamber, means connecting one of said outlets to a point of exhaust for said secondary fluid, and means connecting another of said outlets to said releasing means for actuating the latter upon the collection of a predetermined quantity of secondary fluid in said chamber and discharge of secondary fluid from said chamber.

References Cited in the file of this patent

UNITED STATES PATENTS

| | | |
|---|---|---|
| 1,503,329 | Mitchell | July 29, 1924 |
| 2,079,412 | Justus | May 4, 1937 |
| 2,186,069 | Hazard | Jan. 9, 1940 |
| 2,292,007 | Morgan | Aug. 4, 1942 |
| 2,307,060 | Moore et al. | Jan. 5, 1943 |
| 2,693,196 | Hundley | Nov. 2, 1954 |